United States Patent
Wurbs et al.

[11] Patent Number: 5,870,199
[45] Date of Patent: Feb. 9, 1999

[54] METHOD AND APPARATUS FOR HIGHLY ACCURATE DISTANCE MEASUREMENT WITH RESPECT TO SURFACES

[75] Inventors: Guido Wurbs, Dusseldorf; Bertold Kruger, Krefeld, both of Germany

[73] Assignee: BetriebsforschungsInstitut VDEH Institut Fur Angewandte Forschung GmbH, Dusseldorf, Germany

[21] Appl. No.: 976,690

[22] Filed: Nov. 24, 1997

Related U.S. Application Data

[63] Continuation-in-part of Ser. No. 800,209, Feb. 12, 1997, abandoned, which is a continuation of Ser. No. 610,072, Feb. 28, 1996, abandoned, which is a continuation of Ser. No. 319,487, Oct. 7, 1994, abandoned, which is a continuation of Ser. No. 115,088, Sep. 2, 1993, abandoned.

[30] Foreign Application Priority Data

Sep. 2, 1992 [DE] Germany .......................... 42 29 313.8

[51] Int. Cl.$^6$ ................................................. G01B 11/00
[52] U.S. Cl. ...................................... 356/376; 250/559.23
[58] Field of Search ................................... 356/371, 372, 356/375, 376, 373, 445–446, 4.01; 250/201.2, 201.6, 561, 559.19, 559.22, 559.23

[56] References Cited

U.S. PATENT DOCUMENTS

| | | | |
|---|---|---|---|
| 3,967,114 | 6/1976 | Cornillault | 356/371 |
| 3,975,102 | 8/1976 | Rosenfeld et al. | 356/376 |
| 4,299,491 | 11/1981 | Waters et al. | 356/376 |
| 4,588,297 | 5/1986 | Inazaki et al. | 356/376 |
| 4,639,140 | 1/1987 | Lerat | 356/376 |
| 4,708,483 | 11/1987 | Lorenz | 356/376 |
| 4,726,685 | 2/1988 | Kobayashi et al. | 356/445 |
| 4,732,485 | 3/1988 | Morita et al. | 356/376 |

FOREIGN PATENT DOCUMENTS

| | | |
|---|---|---|
| 34 35 033 | 3/1986 | Germany . |
| 29 45 251 | 5/1991 | Germany . |

OTHER PUBLICATIONS

Optics and Lasers An Engineering Physics Approach, M. Young, 1977, pp. 100–105.

*Primary Examiner*—Hoa Q. Pham
*Attorney, Agent, or Firm*—Jacobson, Price, Holman & Stern, PLLC

[57] ABSTRACT

A method and apparatus for determining the profile of a surface using contactless distance measurement, wherein a light pencil which has been scattered and reflected from the surface is split into two light pencils having substantially the same distribution of intensities in a plane transverse to the direction of propagation. In doing so, the ratio of the intensities of the two partial pencils is dependent on the principal beam direction of the light pencil which was scattered and reflected from the surface. At least one of the partial pencils is then detected by a photodetector and a resulting signal from the photodetector is evaluated as an accurate measure of surface profile or roughness. By providing this method and apparatus, noise from interference phenomena such as "speckles" is significantly reduced, and thus, the evaluated signal(s) from the photodetector(s) become more reliable.

15 Claims, 1 Drawing Sheet

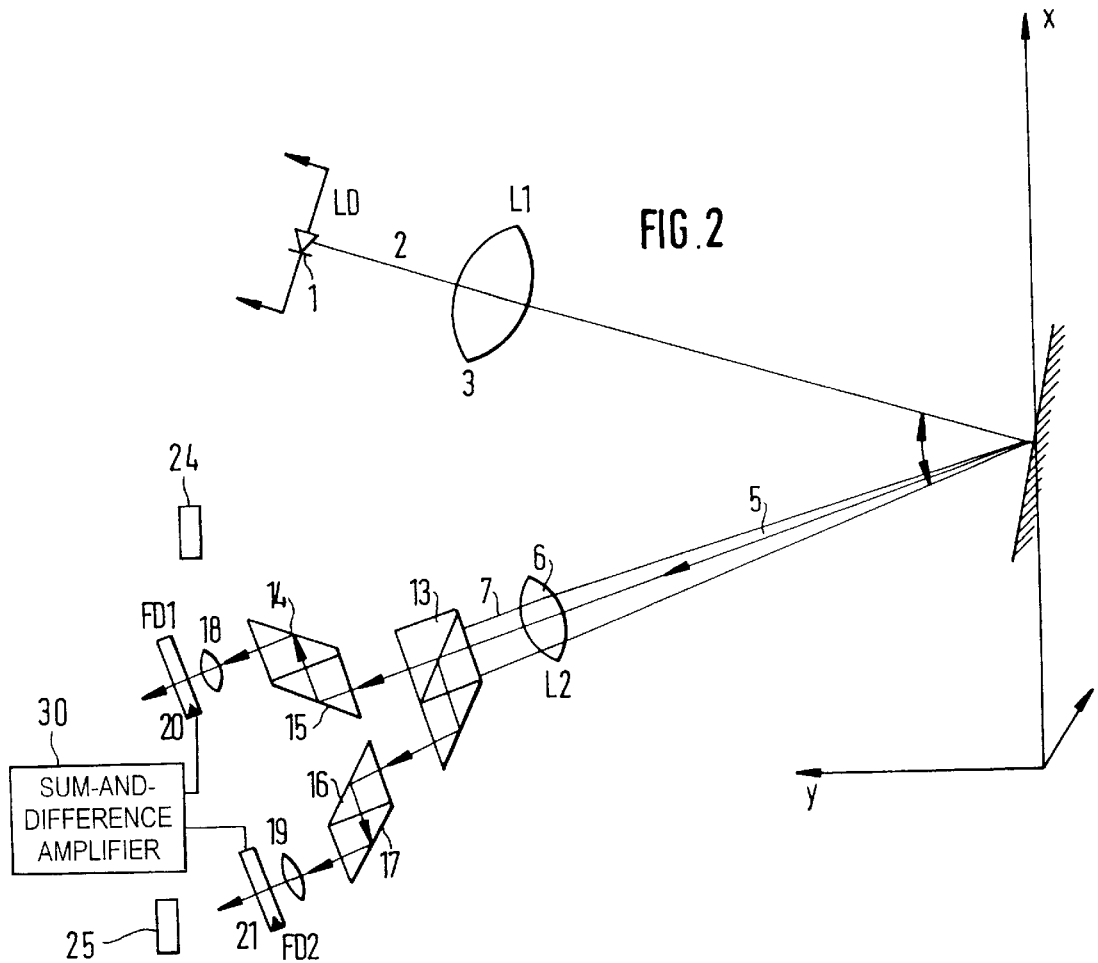

METHOD AND APPARATUS FOR HIGHLY ACCURATE DISTANCE MEASUREMENT WITH RESPECT TO SURFACES

This is a continuation-in-part of application Ser. No. 08/800,209, filed Feb. 12, 1997 which was abandoned upon the filing hereof, which is a continuation of application Ser. No. 08/610,072, filed Feb. 28, 1996 which was abandoned, which is a continuation of Ser. No. 08/319,487 filed Oct. 7, 1994, abandoned, which is a continuation of Ser. No. 08/115,088 filed Sep. 2, 1993, abandoned.

BACKGROUND OF THE INVENTION

The invention relates to a method of determining the profile of a surface using contactless distance measurement, and to an apparatus for also determining the profile of a surface using contactless distance measurement, wherein a light pencil which has been scattered and reflected from the surface is split into two light pencils having substantially the same distribution of intensities in a plane transverse to the direction of propagation.

A method and an apparatus for determining the profile of a surface using contactless distance measurement are known from Ger. OS 34 35 033. According to that document the method of measuring heights and distances in the plane of an object may be carried out without having to focus the imaging optics if the arrangement follows the Scheimpflug rule. In this way, most importantly, the accuracy of the determination can be improved by linearly moving a light spot on the photodetector. The light spot which is the smallest which can be maintained in place is accordingly produced with an edge focused onto the surface to be measured and from there, is imaged on the photodetector. When a laser is used as the light source, a rough surface causes a high level of noise in the measured value, particularly in the form of numerous so-called "speckles" in the light spot being imaged on the photodetector. The resulting noise in the photodetector signal is greater when the light spot on the surface which is to be measured is made smaller. For roughness measurements, the diameter of the spot is a few to several microns; and for this reason a laser light should be used. However, the ability to form the image of a sharp edge is limited because of the smallness of the light spot.

It is known from Ger. Pat. 2,945,251 that changes in distance, and thereby surface profiles, can be measured very precisely using a triangulation method. For this purpose, a laser beam is directed obliquely on the surface to be measured. With the aid of optics oriented perpendicularly with respect to the surface, the light spot is imaged onto a position-sensitive photodetector. The light spot imaged onto the photodetector shifts proportionally to the change in distance of the sample. With the aid of a differential photodiode or a row of photodiodes acting as the photodetector means, the shift in the light spot and thereby the change in the distance from the laser to the surface to be measured is determined, e.g. by electrical means. The principal shortcoming of this method is that when a rough surface is measured using laser light, the light spot is broken up into numerous "speckles", leading to appreciable noise in the measured values.

Sensitive measurement systems have a small scope of measurement. It is therefore a general problem to bring the measuring surface into the existing measuring zone. This problem is, for instance, solved in Morita, U.S. Pat. No. 4,732,485, by using a supplemental measurement system for bringing the measurement surface into a correct position.

Another problem with the prior art is the effect of reflections on the measurement system. Since the diodes will measure any kind of intensity alteration, certain reflections from the measuring surface occurring, when not a surface roughness, but a depression or elevation, completely outside of the scope of measurement cannot be distinguished and will be seen as measured values.

SUMMARY OF THE INVENTION

The present invention begins with and then departs from the state of the art set forth above. A primary object of the present invention is to solve the foregoing problems associated with the prior art by reducing the laser noise or speckle noise in the measured values by using a triangulation method, such that even in the case of a very small light-spot diameter one can measure distance changes with high precision. This should open up the possibility of determining surface roughness using such measurements.

This problem is solved according to the invention by providing a method and apparatus for splitting a light pencil which has been scattered and reflected by the surface into two light pencils having substantially the same distribution of intensities in a plane transverse to their respective principal directions of propagation. Under these conditions the ratio of the intensities of the two partial pencils is dependent on the principal beam direction of the light pencil scattered and reflected from the surface. Accordingly, one or both of the partial pencils can then be detected by photodiode means and a resulting signal from the photodiode means evaluated as a measure of the roughness.

To illustrate the invention, reference is made to the following description of exemplary embodiments, and the drawings which depict them schematically, which embodiments and drawings serve for more detailed explanation.

BRIEF DESCRIPTION OF THE DRAWINGS

FIG. 1 shows a first embodiment of the invention which a deflecting prism for angle-dependent splitting; and FIG. 2 shows a second embodiment of the invention, having two deflecting prisms which are arranged and operate to deflect away from one another, and further having a sum-and-difference amplifier connected to the two photodetectors disposed downstream in the optical path.

DETAILED DESCRIPTION OF THE PREFERRED EMBODIMENTS

FIG. 1 shows a laser diode 1 the collimated laser beam 2 of which is directed by imaging optics 3 to the test surface 4 which is to be measured. The scattered and reflected light pencil 5 is then converted to a substantially parallel light pencil 7 by means of a collimator 6. This pencil 7 then strikes a deflecting prism 8, which splits pencil 7 into two partial pencils (9, 10) having nearly identical distributions of intensity in a plane normal to their respective main beam direction, that is, the primary direction of propagation of each partial pencil. Regarding the main beam direction of the pencil 7, the angle of incidence on the hypotenuse surface of deflecting prism 8 is preferably set at the transition to total reflection. It is understood that the hypotenuse surface represents an interface between the dielectric medium which forms the prism 8 and a less dense dielectric medium surrounding the prism 8. It is further understood that the angle between the beam 2 and the surface 4 may be selectively adjusted. The ratio of the overall intensities (in each case summed over the cross section) of the two partial pencils (9, 10) is then dependent only on the angle of incidence, and therefore on the main beam direction of the pencil 5 comprised of light scattered and reflected from the surface. The reflected partial pencil 10 is then passed to a first photodetector 12, and/or the transmitted partial pencil is passed to a second photodetector 11. The electrical signal outputs from the two photodetectors (11, 12) (which may comprise, e.g., photodiodes or linear photodiodes or photo cameras or a photodiode array) may be employed in such a way that the signal of one of the two photo detectors (11 or 12) is maintained at a constant level (e.g. by changing the intensity of laser diode 1) and the signal of the other photodiode (11, 12) is measured and displayed. In this way, compensation is provided for changes in the reflectivity of the surface 4. Another possibility is to maintain constant the sum of the signal intensities of the two photodetectors and to measure and display the difference. In this case, the outputs from the two photo detectors (11,12) may be connected to a sum-and-difference amplifier.

FIG. 2 shows, similarly to the exemplary embodiment of FIG. 1, a laser diode 1, the collimated laser beam 2 from which is directed by imaging optics 3 onto the surface 4 of the test article which is to be measured, and the pencil 5 of scattered and reflected light is then transformed by a collimator 6 into a substantially parallel light pencil 7. Pencil 7 is then split into two equal partial pencils which are then deflected at the hypotenuse surfaces of two respective pairs of prisms (14, 15; 16, 17) disposed downstream in the optical path. The angle of incidence on the hypotenuse surfaces is preferably at the transition to total reflection. The prisms (14, 15; 16, 17) are adjusted such that when the angle of the light pencil 7 is changed, the angle of incidence of one of the partial pencils approaches the total reflection angle, while the angle of incidence of the other partial pencil progresses farther from the total reflection angle. In this regard, the prism pairs (14, 15; 16, 17) operate appositely with regard to one another. The two light pencils, each of which has been reflected twice, are each passed through a respective lens (18; 19) to a respective photodiode (20; 21). The transmitted part need not be utilized in the present exemplary embodiment. The signals are then processed as in exemplary embodiment 1. The output from the photodiodes (20;21), for example, can be connected to a sum-and-difference amplifier 30 as indicated above. The adjustability of the prism pairs affords free selection of the operation point on the transmission/reflection curve, thereby enabling optimal exploitation of the sensitivity of the method.

In another embodiment of the invention, at least one extra diode (as shown, for instance, as element 24) is positioned beside the first diode of the measuring system and therefore provides a signal when the measuring surface is outside of, or leaves, the scope of measurement of the first diode. Likewise, an extra diode 25 may be positioned next to the second diode. This simplifies the procedure of bringing the measuring surface into the right position within the scope of measurement and avoids measuring reflections as actual measuring values.

Whenever the light pencil moves out of the diode surface area the extra diode will provide a signal, making it possible to eliminate all measuring signals received from the measuring system during the out range situation.

We claim:

1. An apparatus for determining the profile of a surface using contactless distance measurement and triangulation, comprising a triangulation arrangement for use with a measuring beam, said triangulation arrangement comprising:

imaging optics for aiming the measuring beam at a surface to thereby provide a scattered and reflected light pencil;

a deflecting body disposed in a beam path of said scattered and reflected light pencil, and oriented so that said scattered and reflected light pencil strikes a surface of the deflecting body at an angle close to the total reflection angle, said deflecting body thereby generating two partial pencils having substantially the same distribution of intensity on a specific surface of measurement defined transversely with respect to a principal direction of propagation for each partial light pencil;

first and second photo detectors respectively disposed in the beam paths of said two partial pencils, said first and second photo detectors respectively providing first and second output signals which can be processed to determine the profile of said surface, said apparatus controlling an intensity of said measuring beam so that a sum of said first and second output signals remains constant, a difference between said first and second output signals being indicative of the profile, said apparatus being adjustable so that an angle defined between said measuring beam and said surface is selectively adjusted.

2. The apparatus of claim 1, wherein said deflecting body is a deflecting prism and wherein said surface of the deflecting body comprises the hypotenuse of said deflecting prism.

3. The apparatus of claim 1, wherein said photodetectors are linear photodiodes.

4. The apparatus of claim 1, wherein said photodetectors comprise a linear photodiode array.

5. The apparatus of claim 1, wherein said measuring beam is a laser beam.

6. An apparatus of claim 1 comprising supplemental photo detectors positioned next to first and second photo detectors for detection of said partial light pencil, when said partial light pencil moves out of the range of the first and second photo detectors.

7. An apparatus for determining the profile of a surface using contactless distance measurement and triangulation, comprising a triangulation arrangement for use with a measuring beam, said triangulation arrangement comprising:

imaging optics for aiming the measuring beam at a surface to thereby provide a scattered and reflected light pencil;

a beam splitter disposed in a beam path of said scattered and reflected light pencil to thereby generate two partial pencils;

two prism pairs, each prism pair amplifying a partial pencil by being disposed in the beam path of one of said two partial pencils, and oriented so that each partial pencil strikes two hypotenuse surfaces of one of said prism pairs at an incidence angle close to the total reflection angle, said partial pencils therefore being amplified by being twice reflected to define two twice reflected partial pencils;

two lenses, each lens being disposed in the beam path of one of said twice reflected partial pencils; and first and second photo detectors respectively disposed in the beam paths of said twice reflected partial pencils, said first and second photo detectors respectively providing first and second output signals which can be processed to determine the profile of said surface, said apparatus controlling an intensity of said measuring beam so that a sum of said first and second output signals remains constant, a difference between said first and second output signals being indicative of the profile, said apparatus being adjustable so that an angle defined between said measuring beam and said surface is selectively adjusted.

8. The apparatus of claim 7, wherein said photodetectors are linear photodiodes.

9. The apparatus of claim 7, wherein said photodetectors comprise a linear photodiode array.

10. The apparatus of claim 7, wherein said measuring beam is a laser beam.

11. A method for determining the profile of a surface using contactless distance measurement and triangulation, comprising the steps of:

applying a beam of light to the surface at a certain angle to thereby create a scattered and reflected main pencil of light;

collimating said main pencil of light to define a light pencil that is substantially parallel in each measuring situation;

optically splitting said substantially parallel light pencil into two partial pencils having substantially the same distribution of intensity on the specific surface of measurement defined transversely with respect to a principal direction of propagation for each partial light pencil;

detecting both said partial light pencils using first and second photo detectors; and comparing one of the partial light pencils with the other;

wherein said step of optically splitting includes the steps of directing said substantially parallel light pencil either through a first dielectric medium into an interface between said first dielectric medium and a less dense dielectric medium at an angle close to a total reflection angle and detecting the reflected and the transmitted portion or through a beam splitter and then directing each of the split beams through a first and a second dielectric medium and a less dense dielectric medium at an angle close to a total reflection angle and detecting only the two transmitted portions of each partial beam.

12. The method of claim 11, wherein said outputs from said photodetectors are applied to a sum-and-difference amplifier.

13. The method of claim 11, wherein said outputs from said photodetectors are applied to a difference amplifier.

14. The method of claim 11, wherein said beam of light is a laser beam.

15. A method of claim 11 wherein said partial light pencils are detected by supplemental photo detectors positioned next to first and second photo detectors when the angle of said partial light pencils lead to an incidence position of said partial light pencils outside of the range of the first and second photo detectors.

* * * * *